United States Patent [19]

Peitz

[11] Patent Number: 5,412,760
[45] Date of Patent: May 2, 1995

[54] CIRCUIT ARRANGMENT FOR SWITCHED NETWORKS CONSISTING OF EXCHANGES, PREFERABLY TELEPHONE NETWORKS

[75] Inventor: Albert Peitz, Munich, Germany

[73] Assignee: Peitz GmbH, Munich, Germany

[21] Appl. No.: 782,472

[22] Filed: Oct. 25, 1991

Related U.S. Application Data

[63] Continuation of Ser. No. 513,506, Apr. 20, 1990, abandoned.

[30] Foreign Application Priority Data

Mar. 19, 1990 [DE] Germany ............... 40 08 790.5

[51] Int. Cl.$^6$ .......................... H04Q 7/04; H04J 3/16
[52] U.S. Cl. ........................... 370/95.1; 379/58; 455/34.1; 455/54.1
[58] Field of Search ............ 370/95.1, 95.3, 71, 370/73, 124, 85.7; 379/58–59, 60, 61, 62, 63; 455/3–6, 33–34, 53–54

[56] References Cited

U.S. PATENT DOCUMENTS

| | | | |
|---|---|---|---|
| 3,663,762 | 5/1972 | Joel, Jr. ................ | 554/33 |
| 4,193,031 | 3/1980 | Cooper .................. | 370/50 |
| 4,646,296 | 2/1987 | Bartholet ............... | 370/124 |
| 4,768,188 | 8/1988 | Barnhart et al. ......... | 370/95.3 |
| 4,789,983 | 12/1988 | Acampora et al. ......... | 370/84 |
| 4,930,120 | 5/1990 | Baxter et al. ........... | 370/73 |

*Primary Examiner*—Douglas W. Olms
*Assistant Examiner*—Hassan Kizou
*Attorney, Agent, or Firm*—Banner, Birch, McKie & Beckett

[57] ABSTRACT

A telecommunication exchange system in which the fixed location subscribers, like the mobile station subscribers, are provided with individual identifications which are used to assign communication channel pairs to each call to and from both fixed and mobile subscribers. This is accomplished by use of broad-band cables connected from the exchanges all the way to the fixed subscribers' premises.

3 Claims, 1 Drawing Sheet

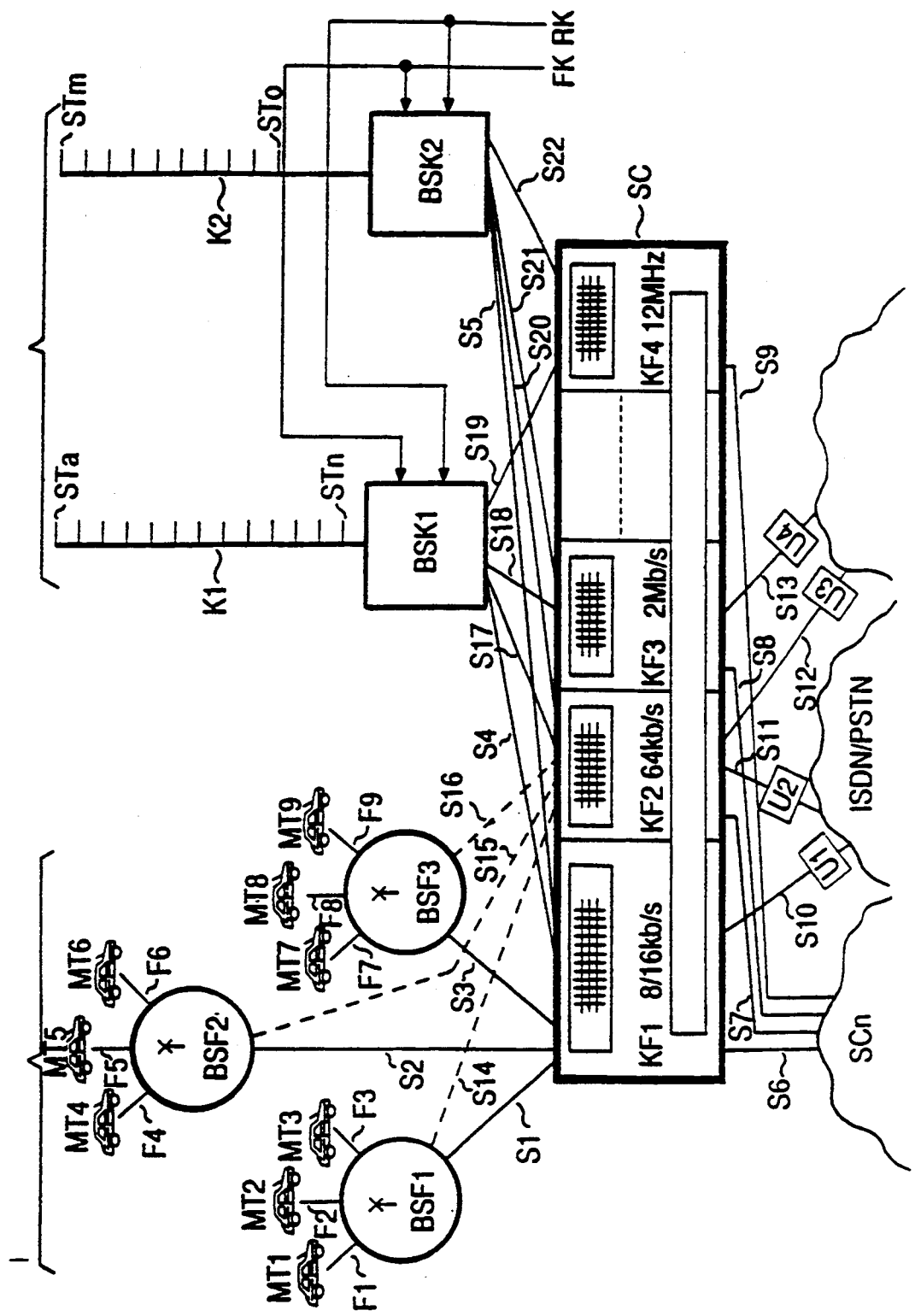

CIRCUIT ARRANGEMENT FOR SWITCHED NETWORKS CONSISTING OF EXCHANGES, PREFERABLY TELEPHONE NETWORKS

This is a continuation of application Ser. No. 07/513,506 filed Apr. 20, 1990, now abandoned.

The invention relates to a circuit arrangement for switched networks consisting of exchanges, preferably telephone networks, in which mobile subscribers have access via radio paths and stationary subscribers via cable paths to an exchange, with each mobile subscriber being assigned an individual identification, with which identification the subscriber answers (identification signal) and is thus identified and located by the exchange, whereafter, for the establishment of a connection from the subscriber to the exchange or vice versa, a communication-channel pair is assigned to the mobile subscriber by the exchange.

Such a circuit arrangement, frequently referred to as a mobile communication system, is described in the Siemens AG publication "D 900 Digital Mobile Communication System" and is shown in particular in FIG. 1.1. This system is intended for use in various countries, including the Federal Republic of Germany.

The object of the invention is to create a switched network in which a public switched network (with individual subscriber lines to the exchanges to the network), referred to conventionally as a stationary network, is combined with a mobile communication system on the basis of a uniform network structure, with a further intention being to reduce the outlay on lines for access to the exchanges.

The object of the invention is achieved in that both the mobile and the stationary subscribers are each assigned an individual identification and the mobile and the stationary subscribers have access to the same exchanges, with the access of the stationary subscribers being by means of broad-band cables, preferably fiber optic cables, through which cables there is the same signalling system (identification signal), channel assignment (communication-channel pair) and message transmission as between the exchanges and the mobile subscribers connected to them, such that each subscriber, irrespective of whether mobile or stationary, can be served in identical manner by each exchange.

With this design of network, the mobile and the stationary subscribers are connected in operationally identical manner to "one" uniform switched network in which all subscribers now have only person-related network access, since there are none of the individual subscriber lines customary in known stationary networks. Owing to the person-related network access, applicable to all subscribers, it makes no operational difference to subscribers whether they use their terminal devices in a stationary manner, e.g., in a house, or in a mobile manner, e.g., in a motor vehicle. Via their individual identifications, subscribers can be reached with their terminal devices at any location within the entire switched network and can also set up calls from any location, with, in each ease, the subscriber being allocated a communication-channel pair, this being accomplished via radio in the case of mobile use and via the broad-band cable, routed into the house, in the case of use within a house.

The mobile communication systems currently provided in the countries of western Europe operate on the basis of a bit rate of 8 or 16 kb/s (kilobit/second) per speech channel. Conversely, the concurrently existing stationary public telephone network, the ISDN network, requires a bit rate of 64 kb/s. This necessitates the use of conversion devices at the transition from the mobile communication system to the stationary network and vice versa. Such conversion devices are not necessary in the uniform switched network according to the invention, because such a uniform network is able to employ a uniform bit rate for both mobile and stationary access.

Compared with the conventional stationary public switched network, the known mobile communication system has the advantage that the mobile network needs only as many communication-channel pairs as are required by the maximum anticipated volume of traffic. Conversely, the conventional stationary network is equipped with individual subscriber lines. This large number of individual subscriber lines is not necessary in the uniform network according to the invention, since, also for the stationary subscribers, only as many communication-channel pairs are needed as are required by the volume of traffic anticipated in the particular area. In this manner, therefore, there is a considerable reduction in the hitherto necessary outlay on lines and in the outlay on subscriber-specific connection circuits in the exchanges.

Owing to the use of broad-band cables for the access of the subscribers to the exchanges, it is possible, through the employment of repeaters, which readily amplify all the information of the communication-channel pairs transmitted via the broad-band cable, to achieve a service area of virtually any size for an exchange. Since, in the uniform public switched network under consideration here, the capacity in terms of communication-channel pairs to be accommodated in a broad-band cable depends not, as in the conventional stationary network, on the number of subscribers with their individual subscriber lines, but on the number of communication-channel pairs determined by the volume of traffic, it is possible with a broad-band cable equipped with repeaters to serve a particularly large number of stationary subscribers, since the use of the broadband cable with its repeaters eliminates any problems with regard to range. Conversely, in the conventional networks with individual subscriber lines, the problem with regard to range is all the greater, the higher is the bit requirement of the call-processing principle employed. In the ISDN system increasingly employed in the Federal Republic of Germany, this bit requirement is 144 kb/s, which leads to a maximum range of an individual subscriber line, consisting of a copper wire pair, of only approx. 4 km. Individual repeaters can be discounted from the outset with this technology because of the associated enormous outlay. The consequence of this is that, owing to the use of broad-band cables in the switched network according to the invention, it is possible to serve a far larger number of stationary subscribers from one exchange than in the case of a network with individual subscriber lines. With the switched network according to the invention, the number of subscribers that can be served by one exchange is then determined only by the volume of traffic that can reasonably be handled by one exchange. An exchange in the switched network according to the invention is able—allowing for the volume of traffic that can reasonably be expected of it—to provide access, for example, to approx. 300,000 subscribers, whereas the exchanges (local exchangers) of the currently used network with individual subscriber lines serve some 5,000 subscribers on account of the aforementioned problems with regard to range and on account of the local conditions.

Furthermore, the uniform switched network according to the invention offers the subscriber the advantage that he/she can take his/her terminal device (of the kind used in the known mobile communication system) anywhere within the area of the switched network, i.e., he/she can use the terminal device as a stationary or mobile telephone. The subscriber requires just one single individual identification for this purpose, i.e., he/she has one single directory number under which he/she is listed in the telephone directory. Thus, the switched network covers all possible types of telephone lines, i.e., personal domestic telephones, mobile telephones in motor vehicles and, in particular, also all commercial telephones. For the subscribers of the public switched network according to the invention, this means that, for just one basic charge for a telephone, they can avail themselves of the advantages both of the stationary network and also of the mobile network.

Experience shows that the majority of telephone calls conducted from a mobile location lead into the stationary network. The call charges typical of the respective network are incurred in each of the two networks, i.e., the subscriber has to bear the sum of these charges. Since, in the switched network according to the invention, mobile and stationary subscribers are connected to the same exchanges, the call charges relate only to the one uniform network, i.e., telephoning is made cheaper.

The use of the broad-band cable makes it possible in advantageous manner also to provide communication services relating to data and video transmission. Moreover, it is also possible for dedicated further message channels, e.g., television and radio channels, to be transmitted via these broad-band cables. Furthermore, broad-band cabling on the basis of fiber optic cables provides the advantage of a large frequency-band reserve, with the result that it is possible to transmit not only a particularly large number of communication-channel pairs of known communication services, but also a multiplicity of further as yet unknown communication services, above all those with a larger frequency requirement. In order to serve these communication services with their terminal devices, e.g., video-reproduction devices, from the call-processing point of view, use can be made of the dialing equipment and function keys provided for this purpose on the telephone set, as a result of which the advantages of the switched network according to the invention apply also to such services.

Calls from mobile subscribers are conducted predominantly with stationary subscribers, i.e., in the existing networks, there is usually a transition from an exchange for mobile subscribers to the stationary network. Since the stationary network, insofar as it is already an ISDN network, employs a bit rate of 64 kb/s, each call coming from the mobile network is normally converted to the bit rate of the ISDN network, i.e., 64 kb/s, already at the exchange of the mobile subscriber. It must be remembered in this connection that the bit rate required for the mobile network is, however, only 8 or 16 kb/s. With the switched network according to the invention being taken as a basis, the procedure is as follows in the case of the transition to existing public switched networks (which will continue to exist in addition to the uniform switched network according to the invention): the communication channels are designed such that they each conform to the bit rate/bandwidth required for the associated message-transmission channel, as a result of which, in the telecommunication network according to the invention, only that bit rate/bandwidth is transmitted for the respective communication channel. Such a bit rate may be, for example, the aforementioned 8 or 16 kb/s. Matching to a different bit rate/bandwidth of the respective existing public switched network is performed only at transitions to the existing public switched networks.

In the switched network according to the invention, the necessary number of such transitions is considerably smaller than the number of subscriber accesses to the exchanges in the known mobile communication system, with the result that the above-described measure yields a considerable reduction in the number of devices necessary for such matching, i.e., the aforementioned conversion devices. Apart from this, in the switched network according to the invention, there is even the essential advantage that, in this network in general, it is possible to employ only the (relatively low) bit rate required for the respective communication channels, i.e., for example, the aforementioned 8 or 16 kb/s instead of the 64 kb/s of the ISDN network. Reference is made to the bandwidth in addition to the bit rate for the reason that, firstly, the bit rate necessitates also an appropriate bandwidth and, secondly, it is also possible, of course, to conceive of communication services that operate in analog manner.

Shown in the FIGURE is a specimen embodiment of the invention.

The FIGURE shows the switched network with mobile subscribers MT1 to MT9 connected via radio paths F1 to F9 and with stationary subscribers STa–STn and STm–STo connected via cable paths K1 and K2. Said stationary subscribers may also be video and data terminal devices. With regard to the radio paths, the specimen embodiment shown here comprises three radio base stations BSF1 to BSF3, which, in the manner known from a mobile communication system, supply the mobile subscribers, moving within a geographically defined area, with radio frequencies, which form the communication-channel pairs. Of course, a larger number of radio base stations may be provided within such a geographical area. This depends, firstly, on the geographical conditions and, secondly, on the traffic density. The individual base stations BSF1 to BSF3 are connected to the exchange SC via digital signal lines S1 to S3.

The connection of the stationary subscribers STa–STn and STm–STo via the cable paths is accomplished by the connection of the stationary subscribers STa–STn to the broad-band cable K1 and of the stationary surefibers STm–STo to the broad-band cable K2. The broad-band cables K1 and K2 are each routed, e.g., in an urban area, through the territory of said area and, as in the case of the known connections of television sets, have branches that extend into each individual house. The two cables K1 and K2 are connected to the base stations BSK1 and BSK2, which, like the radio base stations BSF1–BSF3, are connected to the exchange SC, with this being accomplished via the digital signal lines S4 and S5.

The exchange SC, which is designed and operates like an exchange from the known mobile communication system, comprises in this case a plurality of switching networks each for a specific bit rate or bandwidth;

more specifically, these are the switching network KF1 for the bit rate 8/16 kb/s, the switching network KF2 for the bit rate 64 kb/s, the switching network KF3 for the bit rate 2 Mb/s and the switching network KF4 for the bandwidth 12 MHz. The broken line between the switching networks KF3 and KF4 is intended to indicate that the exchange SC may, depending on requirements, comprise yet further switching networks. All the switching networks of said exchange SC are controlled by the common control GST, which, in known manner, controls the desired processing of calls between subscribers via the respective switching network.

The FIGURE further shows the connection to further exchanges SCn of a public switched network according to the invention as well as to other public switched networks, namely an ISDN or PSTN network and a data network D. The ISDN/PSTN network is a currently existing conventional public telephone network. It may also be replaced by other telephone networks. The data network D handles known data services.

The connection of the further exchanges SCn to the exchange SC is accomplished via the digital signal lines S6, S7, S8 and S9, via which the particular switching network KF1/KF2/KF3/KF4 used in the exchange SC is connected to further exchanges SCn. It is thus possible in known manner for a call to be set up via a plurality of exchanges SC/SCn as are conventionally provided in a country for serving in the subscribers. The transition to an ISDN/PSTN network or to a data network D is accomplished in appropriate manner via the digital signal lines S10, S11, S12, and S13, with conversion devices U1 to U4 being inserted if necessary (e.g., change of bit rate), into the network transitions before the ISDN/PSTN networks or data networks D.

The setting-up of a call in the uniform switched network shown is effected in accordance with the principles and in the same manner as in a known mobile communication system. An answering subscriber irrespective of whether this is a mobile subscriber MT1–MT9 or a stationary subscriber STa–STo, is assigned a communication-channel pair by the exchange SC, said communication-channel pair, as a frequency band, being either emitted by one of the radio base stations BFS1–BFS3 as a radio signal or transmitted via the cable base stations BSK1 and BSK2 to the cable K1 or K2. Since, as in the known mobile communication system, each callable subscriber is recorded in the exchange SC with his/her identification and local position, the exchange SC is able to determine the desired subscriber in known manner and, via the respective switching network KF1–KF4, to provide the calling and called subscribers with the communication-channel pairs, insofar as the can remains within the area of one exchange SC. Otherwise, a communication-channel pair is connected through in the switching network KF1–KF4 to a digital signal line leading to another exchange, possibly in a different network. The establishing of the call by the assigning of the provided communication-channel pairs to the subscribers is then accomplished in known manner by the identification of both subscribers on the basis of their identifications.

As already mentioned above, the exchange SC comprises a plurality of switching networks, namely the switching networks KF1–KF4, of which each switching network is responsible for a specific bit rate or frequency band. The switching network KF1 with the bit rate 8/16 kb/s is provided preferably for the area of the mobile subscribers MT1–MT9, with, however, the base stations BSF1–BSF3 belonging to said area possibly also being connected to the switching network KF2 for a bit rate of 64 kb/s via the digital signal lines S14, S15 and S16 (indicated by broken lines). In addition to their access to the switching network KF1 via the digital signal lines S4 and S5, the base stations BSK1 and BSK2 responsible for the cable sector also have access to the switching networks KF2, KF3 and KF4, namely via the signal lines S17, S18 and S19 as well as S20, S21 and S22. It is thus possible, via the base stations BSK1 and BSK2 belonging to the stationary sector, also to establish connections for communication services that require a particularly high bit rate/bandwidth. This is achieved in that a particularly broad frequency range can be transmitted via the broad-band cables K1 and K2, which may preferably be fiber-optic cables.

Finally, reference should also be made to the fact that special services are connected to the base stations at BSK1 and BSK2, namely the dedicated radio channels RK and the television channels FK, which inject their message contents via the two base stations BSK1 and BSK2 into the cables K1 and K2, from where the respective messages are then transmitted in known manner (cable TB) to the subscribers.

What is claimed is:

1. A circuit arrangement for switched networks containing exchanges, such as telephone networks, in which mobile subscribers (MT1–MT9) via radio paths (F1–9) and stationary subscribers (Sta–STo) via cable paths (K1–K2) each have access to an exchange (SC), the radio paths and the cable paths each providing multiple communication channel pairs, and in which each mobile subscriber as well as each stationary subscriber has a terminal device to which is assigned identification, with which the subscriber identifies himself and is thus identified and located by the exchange at any location within the switched network independent of whether mobile or stationary, whereafter, for the establishment of a connection from the subscriber to the exchange or vice versa, a communication-channel pair is assigned, from the provided pairs, so that the mobile and stationary subscribers have access to the same exchange, said cable paths being broad-band cables connected by branches of the television cable connection type to individual subscribers, said cables being routed throughout subscriber areas and extending up to the stationary subscribers, without intervention by the exchange after the assignment of the communication-channel pair and without connection by means of wired channels other than said branches to the cables, whereby each subscriber, whether mobile or stationary is reached in operationally identical manner and each mobile subscriber and each stationary subscriber has access to all the communication channel pairs which are provided by the respective radio paths and cable paths and whereby each subscriber can set up calls and can be reached at any location under his identification.

2. Circuit arrangement according to claim 1, characterized in that the messages transmitted from the exchange (SC) in particular to the stationary subscribers (STa–STo) are data- and video-transmission messages.

3. Circuit arrangement according to claim 1 characterized in that dedicated message channels (FK, RK), are transmitted via the broad-band cables (K1, K2).

* * * * *